US012624943B2

(12) United States Patent
Yamada

(10) Patent No.: US 12,624,943 B2
(45) Date of Patent: May 12, 2026

(54) PILING SNOW DEPTH MEASUREMENT SYSTEM

(71) Applicant: Yamada Giken Co., Ltd, Fukui City (JP)

(72) Inventor: Tadayuki Yamada, Fukui City (JP)

(73) Assignee: YAMADA GIKEN CO., LTD., Fukui City (JP)

( * ) Notice: Subject to any disclaimer, the term of this patent is extended or adjusted under 35 U.S.C. 154(b) by 302 days.

(21) Appl. No.: 18/697,149

(22) PCT Filed: Nov. 21, 2022

(86) PCT No.: PCT/JP2022/043001
§ 371 (c)(1),
(2) Date: Mar. 29, 2024

(87) PCT Pub. No.: WO2023/090442
PCT Pub. Date: May 25, 2023

(65) Prior Publication Data
US 2024/0401944 A1     Dec. 5, 2024

(30) Foreign Application Priority Data
Nov. 22, 2021   (JP) ................................. 2021-189184

(51) Int. Cl.
*G01B 21/18* (2006.01)
(52) U.S. Cl.
CPC ................................... *G01B 21/18* (2013.01)
(58) Field of Classification Search
CPC ...... G01B 21/18; G01B 21/045; G01B 21/04; G08B 19/02; G01W 1/14
See application file for complete search history.

(56) References Cited

U.S. PATENT DOCUMENTS 5,762,447 A * 6/1998 Hachiki ................ E01C 11/245
404/71
2005/0047864 A1   3/2005 Yamada et al.
(Continued)

FOREIGN PATENT DOCUMENTS

JP        H03242594 A  * 10/1991
JP        8-27713        1/1996
(Continued)

OTHER PUBLICATIONS

International Search Report issued Dec. 27, 2022 in International Application No. PCT/JP2022/043001.

*Primary Examiner* — Laura Martin
*Assistant Examiner* — Julia Fitzpatrick
(74) *Attorney, Agent, or Firm* — Wenderoth, Lind & Ponack, L.L.P.

(57) ABSTRACT

Each of heat quantity measurement apparatuses 20a to 20c includes a snow receiving plate 22 configured that falling snow piles up thereon, a heater device 25 configured to heat the snow receiving plate until a temperature of the snow receiving plate 22 becomes predetermined target temperature exceeding 0 degrees Celsius, and a heat flux density measurement apparatus (24a to 24d) configured to measure heat flux density transmitted from below to the snow receiving plate 22. A piling snow depth measurement apparatus 14 measures a piling snow depth of snow piling up at a first location 13. A control apparatus 15 computes a quantity of heat spent to melt the snow falling on the snow receiving plate 22, and estimates a piling snow depth at second locations 12a to 12d, based on the computed quantity of heat and the piling snow depth measured by the piling snow depth measurement apparatus 14.

6 Claims, 4 Drawing Sheets

(56)          References Cited

U.S. PATENT DOCUMENTS

| | | | |
|---|---|---|---|
| 2009/0300930 A1* | 12/2009 | Ishikawa | G01B 5/28 |
| | | | 73/105 |
| 2013/0047718 A1* | 2/2013 | Chae | G01F 23/242 |
| | | | 73/170.21 |
| 2018/0136105 A1* | 5/2018 | Choi | G01W 1/14 |
| 2019/0360739 A1* | 11/2019 | Brown | E01D 19/16 |

FOREIGN PATENT DOCUMENTS

| | | | | |
|---|---|---|---|---|
| JP | 2001-248108 | 9/2001 | | |
| JP | 2005-69699 | 3/2005 | | |
| JP | 2006/83633 | 3/2006 | | |
| KR | 101803603 B1 * | 11/2017 | | G01B 21/32 |

\* cited by examiner

PILING SNOW DEPTH MEASUREMENT SYSTEM

TECHNICAL FIELD

The present invention relates to a system for measuring piling snow depth.

BACKGROUND ART

Patent Document 1 discloses a road surface sensor including a non-contact piling snow depth measurement instrument.

Patent Document 2 discloses to supply electric power to an electric heating element so as to maintain a surface temperature of a snow receiving board at –0 degrees Celsius, and to find out a quantity of heat for melting snow from the supplied electrical energy.

Patent Document 3 discloses to supply electric power to an electric heating element so as to maintain a surface temperature of a simulated road surface material at a predetermined temperature, and compute a quantity of heat naturally supplied from the roadbed, based on the supplied electrical energy and a temperature of an actual road surface.

PRIOR ART DOCUMENTS

Patent Literature

[Patent Document 1] JP 2005-069699 A
[Patent Document 2] JP H08-27713 A
[Patent Document 3] JP 2006-083633 A

SUMMARY OF THE INVENTION

Technical Problem

Snow piling up on a runway of an airfield hinders airplanes from taking off and landing on.

For this reason, snow removal begins when piling snow depth exceeds a predetermined threshold value, e.g., 5 cm.

Since the non-contact piling snow depth measurement instrument disclosed in Patent Document 1 requires to install equipment above the ground, it can be installed only in a location away from the runway in order to prevent it from coming into contact with airplanes traveling on the runway.

The technique disclosed in Patent Document 2 enables to find out the energy to be supplied to the electric heating element for melting snow. However, the energy consumed at the electric heating element is not equal to the heat of fusion of the piling snow, because of the influence of geothermal heat, solar radiation, radiative cooling, or others. Even if the heat of fusion of the piling snow is known, what can be found out from it is mass of the piling snow. Density of the piling snow differs depending on weather or others. Thus, the volume of the piling snow cannot be found out without knowing the density of the piling snow. Therefore, the piling snow depth cannot be found out.

Solution to Problem

A piling snow depth measurement system includes at least two heat quantity measurement apparatuses, a piling snow depth measurement apparatus, and a control apparatus. Each of the heat quantity measurement apparatuses includes a snow receiving plate configured that falling snow piles up thereon, a heater device configured to heat the snow receiving plate until a temperature of the snow receiving plate becomes a predetermined target temperature exceeding 0 degrees Celsius, and a heat flux density measurement apparatus configured to measure heat flux density transmitted from below to the snow receiving plate. A first heat quantity measurement apparatus of the heat quantity measurement apparatuses is installed within a first location. A second heat quantity measurement apparatus of the heat quantity measurement apparatuses is installed within a second location. The piling snow depth measurement apparatus measures a piling snow depth of snow piling up at the first location. The control apparatus computes a quantity of heat spent to melt snow falling on the snow receiving plate, for each of the heat quantity measurement apparatuses, based on energy consumed by the heater device and a heat flux density measured by the heat flux density measurement apparatus. The control apparatus estimates a piling snow depth at the second location, based on the computed quantity of heat and the piling snow depth measured by the piling snow depth measurement apparatus.

Advantageous Effects of the Invention

The piling snow depth measurement system enables accurate measurement of the piling snow depth at the second location without installing any equipment above the ground within the second location.

DETAILED DESCRIPTION OF THE INVENTION

Figure 1:
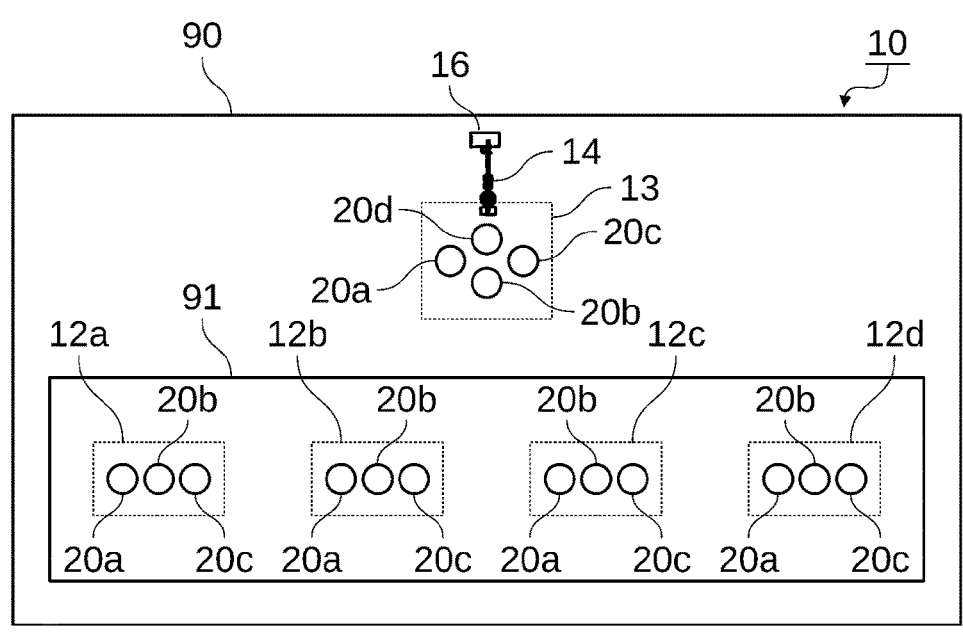
FIG. 1 is a plan view showing an example of a piling snow depth measurement system.

Referring to FIG. 1, a piling snow depth measurement system 10 will be described.

The piling snow depth measurement system 10 is installed, e.g., within an airport 90, and measures a piling snow depth at a location where no equipment can be disposed above the ground, e.g., a runway 91.

The piling snow depth measurement system 10 includes, e.g., a number of heat quantity measurement apparatuses 20a to 20d, a piling snow depth measurement apparatus 14, and a control apparatus 16.

The heat quantity measurement apparatuses 20a to 20d are disposed at several locations 12a to 12d and 13 within the airport 90. Among them, the locations 12a to 12d are examples of second locations, and located within the runway 91. Airplanes that take off from and land on the airport 90 travel on them. For this reason, no equipment can be disposed above the ground within the locations 12a to 12d.

In contrast, the location 13 is an example of a first location, and away from the runway 91. Thus, equipment can be disposed above the ground.

At the location 12a, e.g. three heat quantity measurement apparatuses 20a to 20c are disposed.

At the location 12b, e.g., three heat quantity measurement apparatuses 20a to 20c are also disposed.

At the location 12c, e.g., three heat quantity measurement apparatuses 20a to 20c are also disposed.

At the location 12d, e.g., three heat quantity measurement apparatuses 20a to 20c are also arranged.

At the location 13, e.g., four heat quantity measurement apparatuses 20a to 20d are arranged.

The piling snow depth measurement apparatus 14 is disposed near the location 13, and measures a piling snow depth at the location 13.

The control apparatus 16 is, e.g., a computer, and communicates with the heat quantity measurement apparatuses 20a to 20d, the piling snow depth measurement apparatus 14 and others, to obtain information, and estimates the piling snow depth at the locations 12a to 12d, based on the obtained information.

Figure 2:
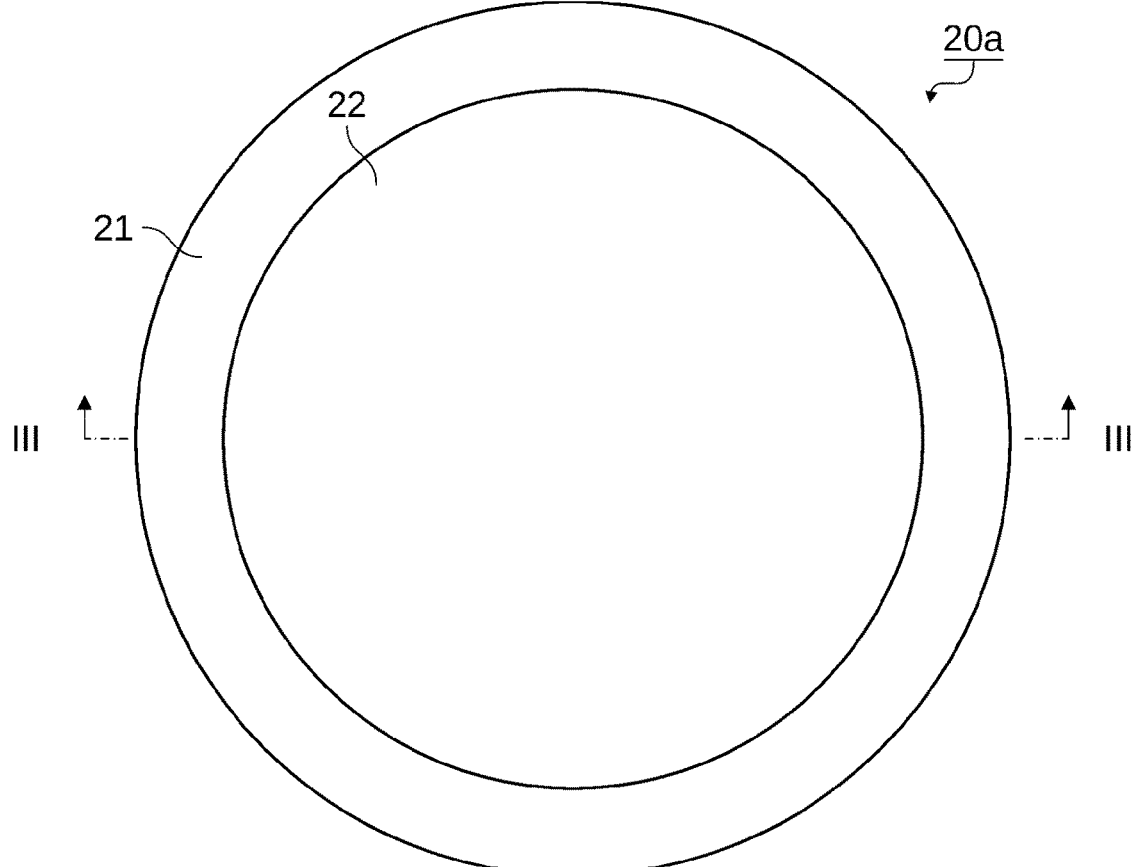
FIG. 2 is a plan view showing an example of a heat quantity measurement apparatus.
Figure 3:
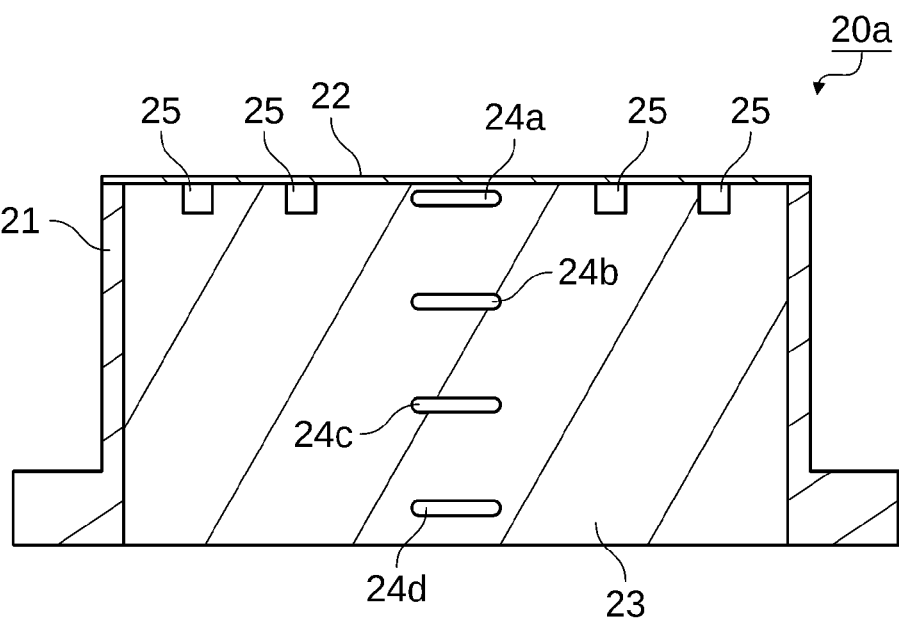
FIG. 3 is a III-III cross-sectional view showing the heat quantity measurement apparatus.
Figure 4:
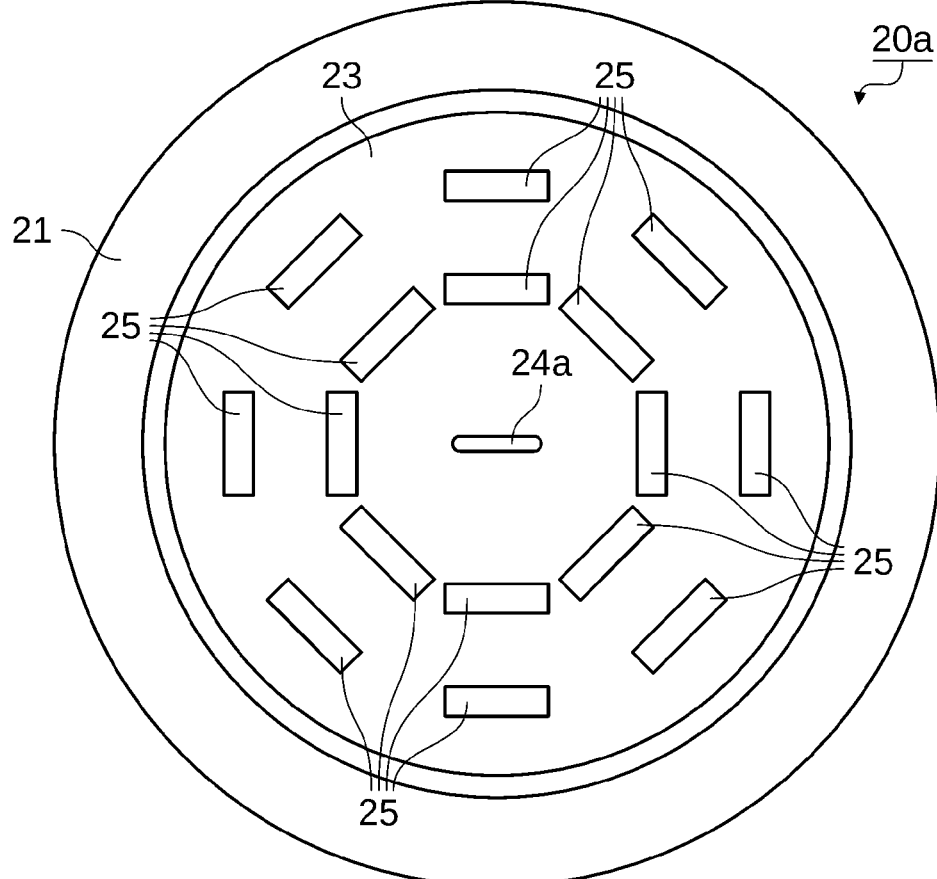
FIG. 4 is an exploded plan view showing the heat quantity measurement apparatus.

Referring to FIGS. 2 to 4, the heat quantity measurement apparatus 20a will be described.

The heat quantity measurement apparatus 20a heats the snow receiving plate 22 by using the heater device 25, to maintain the temperature of the snow receiving plate 22 at a predetermined target temperature higher than 0 degrees Celsius, e.g., 1 degree Celsius.

When snow falls on the snow receiving plate 22, the snow melts and takes heat away from the snow receiving plate 22. Thus, the energy, or electric power, consumed by the heater device 25 is a function of the amount of snow falling on the snow receiving plate 22.

Figure 5:
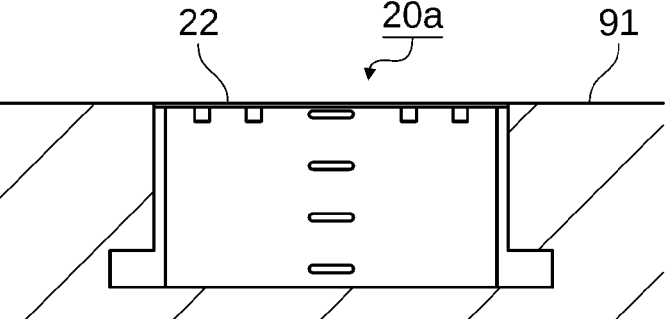
FIG. 5 is a cross-sectional side view showing the heat quantity measurement apparatus, in an installed state.

As shown in FIG. 5, the heat quantity measurement apparatus 20a is embedded in the ground such that the upper face of the snow receiving plate 22 is at a height substantially the same as that of the surface of the runway 91.

For example, it is installed on, and in close contact with, a roadbed below the runway 91.

This leads the snow receiving plate 22 to be warmed by geothermal heat, in addition to the heat generated by the heater device 25. Influence of the geothermal heat can vary depending on the locations 12a to 12d and 13, which may be an error factor.

For this reason, in order to accurately evaluate the influence of the geothermal heat, the heat quantity measurement apparatus 20a measures heat flux density caused by geothermal heat.

Returning to FIGS. 2 to 4, the description of the heat quantity measurement apparatus 20a will be continued.

The heat quantity measurement apparatus 20a includes, e.g., a container 21, a snow receiving plate 22, a filler material 23, temperature sensor devices 24a to 24d, and heater devices 25.

The container 21 has, e.g., a substantially cylindrical shape, and has a height, e.g., between 17 and 20 cm.

The container 21 is preferably made of a material having a thermal conductivity that is close to that of the material constituting the runway 91. This purposes to prevent the heat flux transferred from the ground to the surface of the runway 91 from being disturbed. However, the material is not limited to it, and may be an inexpensive one, such as a synthetic resin or others.

The snow receiving plate 22 has, e.g., a substantially disk-like shape, and has a diameter of, e.g., about 0.34 m and an area of, e.g., about 0.091 m$^2$, or 1/11 m$^2$.

The snow receiving plate 22 is made of a material having high thermal conductivity, e.g., metal or others. This purposes to prevent temperature unevenness in the snow receiving plate 22.

The upper face of the snow receiving plate 22 is preferably painted so as to have an emissivity substantially the same as that of the surface of the runway 91. This purposes to replicate heat radiation on the surface of the runway 91. The snow receiving plate 22 is disposed so as to shut an upper opening of the container 21.

The filler material 23 is filled in the container 21. The filler material 23 is made of a material having a thermal conductivity close to that of the material constituting the runway 91, e.g., concrete or others. This purposes to replicate heat flux due to the geothermal heat transferred from the ground to the surface of the runway 91.

In addition, the material of the filler material 23 needs to withstand the load applied to the snow receiving plate 22. The compressive strength of concrete is, e.g., between 18 and 38 N/mm$^2$. On the other hand, the pneumatic pressure of tires of an aircraft is between 1.2 and 1.4 MPa. Therefore, when an aircraft passes over the snow receiving plate 22, it can withstand the load applied to the snow receiving plate 22 from a tire of the aircraft.

The temperature sensor devices 24a to 24d are an example of heat flux density measurement apparatus, and embedded in the filler material 23. The temperature sensor devices 24a to 24d sense ambient temperature.

The temperature sensor device 24a is disposed substantially directly under the approximate center of the snow receiving plate 22, and senses the temperature of the snow receiving plate 22.

The temperature sensor device 24b is disposed substantially directly below the temperature sensor device 24a with a predetermined interval, e.g., 5 cm, apart from the temperature sensor device 24a.

The temperature sensor device 24c is disposed substantially directly below the temperature sensor device 24b with a predetermined interval, e.g., 5 cm, apart from the temperature sensor device 24b.

The temperature sensor device 24d is disposed substantially directly below the temperature sensor device 24c with a predetermined interval, e.g., 5 cm, apart from the temperature sensor device 24c.

Measuring vertical temperature profile in the filler material 23 by the vertically spacedly arranged temperature sensor devices 24a to 24d enables measurement of the heat flux density due to the geothermal heat or others transferred from the ground to the surface of the runway 91.

For example, assuming that the thermal conductivity of the filler material 23 is $\lambda$ [W/mK] and the temperature gradient in the filler material 23 computed based on the temperature measured by the temperature sensor device 24a to 24d is $d\vartheta$[K/m], the heat flux density J is $\lambda \cdot d\vartheta$[W/m$^2$].

The heater device 25 generates heat, e.g., by electric energy, and heats the snow receiving plate 22. The heater device 25 is attached to a lower face of the snow receiving plate 22. For example, eight heater devices 25 are arranged annularly around the center of the snow receiving plate 22, and further eight heater devices 25 are arranged annularly around them.

The heater device 25 is controlled to maintain the temperature of the snow receiving plate 22 at a target temperature, e.g., 1 degrees Celsius. For example, an electric switch is provided between the heater device 25 and an electric power source that supplies electric energy to the heater device 25, and the electric switch is turned on when the temperature of the snow receiving plate 22 is lower than the target temperature, and the electric switch is turned off when the temperature of the snow receiving plate 22 reaches the target temperature. The electric switch may be controlled based on the temperature sensed by the temperature sensor device 24a, or may be a thermistor or other devices autonomously turned on and off.

The total heating capacity of the heater devices 25 is, e.g., 0.1 kW. Assuming that the area of the snow receiving plate 22 is 0.0909 m², the heating capacity per unit area is 1.1 kW/m². It can completely melt falling snow as long as the falling snow is 12 cm per hour or less.

The heat quantity measurement apparatus 20b has similar configuration to the heat quantity measurement apparatus 20a, but the target temperature of the heater device 25 is different from that in the heat quantity measurement apparatus 20a, e.g., 3 degrees Celsius.

The heat quantity measurement apparatus 20c also has similar configuration to the heat quantity measurement apparatuses 20a and 20b, but the target temperature of the heater device 25 is different from those in the heat quantity measurement apparatuses 20a and 20b, e.g., 5 degrees Celsius.

The heat quantity measurement apparatus 20d also has similar configuration to the heat quantity measurement apparatuses 20a to 20c, but differs in the control technique of the heater device 25.

The heat quantity measurement apparatus 20d is provided to measure how high the snow melted in the heat quantity measurement apparatuses 20a to 20c would pile up if it had not been melted. For this reason, the heater device 25 of the heat quantity measurement apparatus 20d is not controlled based on the temperature of the snow receiving plate 22, but is controlled based on the piling snow depth of the snow piling up on the snow receiving plate 22. That is, it is not energized until the piling snow depth reaches a predetermined threshold value, e.g., 5 cm, and once the piling snow depth reaches the threshold value, it is energized until the piling snow disappears.

The heat quantity measurement apparatuses 20a to 20d are manufactured, e.g., as below.

First, the heater devices 25 are fixed to the lower face of the snow receiving plate 22.

Next, the snow receiving plate 22 to which the heater device 25 is attached is fixed to the upper opening of the container 21.

Then, the container 21 is vertically reversed, and the temperature sensor devices 24a to 24d are arranged in it.

Finally, fresh concrete is placed into the container 21 in which the temperature sensor devices 24a to 24d are arranged, and solidified to form the filler material 23.

In order to securely fix the filler material 23 in the container 21, it is desirable to fix, e.g., bolts or others to protrude inward from the side face of the container 21 in advance.

Figure 6:
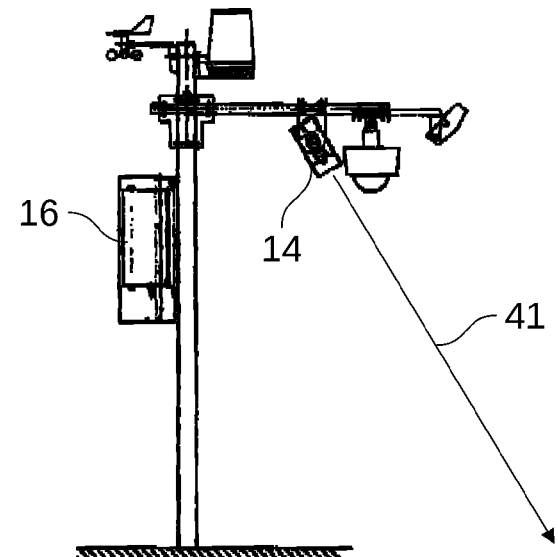
FIG. 6 is a side view showing an example of an observation apparatus.

Referring to FIG. 6, the piling snow depth measurement apparatus 14 will be described.

The piling snow depth measurement apparatus 14 measures depth of snow piling up on the snow receiving plate 22 of the heat quantity measurement apparatus 20d at the location 13.

The piling snow depth measurement apparatus 14 includes, e.g., a laser distance measurement device disposed above the heat quantity measurement apparatus 20d. The laser distance measurement device irradiates laser beam 41 toward the center of the snow receiving plate 22 of the heat quantity measurement apparatus 20d, to measure the distance to the snow receiving plate 22 or the surface of the snow piling up on it, and thereby to measure the depth of the snow piling up on the snow receiving plate 22.

Figure 7:
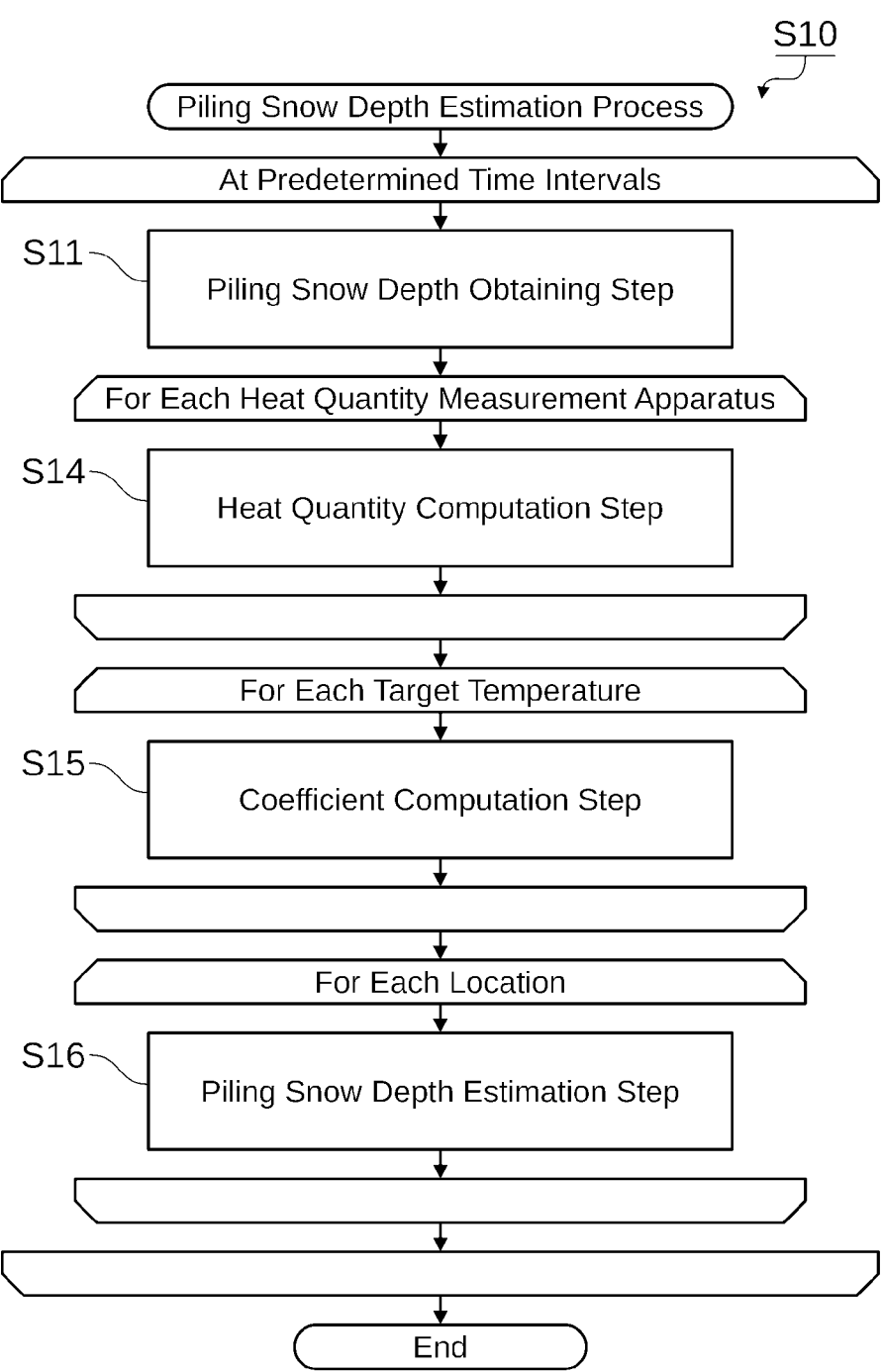
FIG. 7 is a flowchart showing an example of a piling snow depth estimation process.

Referring to FIG. 7, a piling snow depth estimation process S10 will be described.

The control apparatus 16 estimates the piling snow depths at the locations 12a to 12d, e.g., by performing the piling snow depth estimation process S10.

The piling snow depth estimation process S10 includes, e.g., a piling snow depth obtaining step S11, a heat quantity computation step S14, a coefficient computation step S15, and a piling snow depth estimation step S16.

In the piling snow depth estimation process S10, the piling snow depth obtaining step S11 to the piling snow depth estimation step S16 are repeated at predetermined time intervals, e.g., 10 minutes.

First, in the piling snow depth obtaining step S11, the control apparatus 16 obtains the piling snow depth at the location 13 measured by the piling snow depth measurement apparatus 14, and computes an increment $\Delta h_1$ of the piling snow depth in the observation target period, e.g., 10 minutes.

Next, for each of the heat quantity measurement apparatuses 20a to 20c at the locations 12a to 12d and 13, the control apparatus 16 estimates the quantity of heat $Q_{ij}$ spent to melt the snow falling on the snow receiving plate 22, in the heat quantity computation step S14. Note that i is an index representing a location, i=1 represents the location 13, i=2 represents the location 12a, i=3 represents the location 12b, i=4 represents the location 12c, and i=5 represents the location 12d; and that j is an index representing a target temperature.

For example, a quantity of heat $Q_G$ given to the snow receiving plate 22 from the heater device 25 during the observation target period is computed based on the electric power consumed by the heater device 25.

Further, a quantity of heat $Q_C$ given to the snow receiving plate 22 due to geothermal heat or others during the observation target period is computed from the heat flux density computed based on the temperature gradient measured by the temperature sensor devices 24a to 24d.

Then, a total sum $Q_G+Q_C$ of the computed quantity of heat $Q_G$ and quantity of heat $Q_C$ is calculated as the quantity of heat $Q_{ij}$.

Next, for each of the target temperatures, the control apparatus 16 estimates a coefficient of a piling snow depth estimation expression, in the coefficient computation step S15.

The larger amount of snow falls on the snow receiving plate 22, the more quantity of heat $Q_{ij}$ is spent to melt it. Therefore, there is a correlation between the increment of the piling snow depth $\Delta h_{ij}$ and the quantity of heat $Q_{ij}$. For example, assuming that a proportional relation exists between the increment of the piling snow depth $\Delta h_{ij}$ and the quantity of heat $Q_{ij}$, the piling snow depth estimation expression is $\Delta h_{ij}=k_j Q_{ij}$.

The control apparatus 16 computes the coefficient of the piling snow depth estimation expression, based on the quantity of heat $Q_{1j}$ computed in the heat quantity computation step S14 for the heat quantity measurement apparatuses 20a to 20c at the location 13, and the increment of the piling snow depth $\Delta h_1$ at the location 13 computed in the piling snow depth obtaining step S11. For example, in a case that the piling snow depth estimation expression is $\Delta h_{ij}=k_j Q_{ij}$, $k_j=\Delta h_1/Q_{1j}$ is derived from substituting the quantity of heat $Q_{1j}$ and the increment $\Delta h_1$ of the piling snow depth into this expression and solving it for $k_j$. The control apparatus 16 computes the coefficient $k_j$ by calculating this value.

Finally, for each of the locations 12a to 12d, the control apparatus 16 estimates the piling snow depth $h_i$, in the piling snow depth estimation step S16.

For example, the control apparatus 16 computes an increment of the piling snow depth $\Delta h_{ij}$ by substituting the quantity of heat $Q_{ij}$ computed in the heat quantity computation step S14 and the coefficient of the piling snow depth estimation expression computed in the coefficient computation step S15 into the piling snow depth estimation expression, and computes the piling snow depth $h_i$ by accumulating the computed increment $\Delta h_{ij}$. For example, in the case that the piling snow depth estimation expression is $\Delta h_{ij}=k_j \, Q_{ij}$, the increment $\Delta h_{ij}$ is computed by calculating a value obtained by substituting the quantity of heat $Q_{ij}$ and the coefficient $k_j$ into this expression.

Since three heat quantity measurement apparatuses 20a to 20c exist at each location 12a to 12d, three increments $\Delta h_{ij}$ are computed for each location. For example, an average value of the three computed increments $\Delta h_{ij}$ is calculated as an increment $\Delta h_i$ at the location, and it is accumulated to get the piling snow depth $h_i$. Alternatively, three piling snow depths $h_{ij}$ may be computed by separately accumulating the three computed increments $\Delta h_{ij}$, and an average value of them may be used as the piling snow depth $h_i$ at the location.

As described above, the heat quantity measurement apparatuses 20a to 20c embedded in the runway 91 maintains the snow receiving plates 22 at the target temperature, and the quantity of heat spent to melt the snow falling on the snow receiving plates 22 is computed based on the energy consumed by the heater devices 25 and the quantity of heat caused by the geothermal heat or others supplied to the snow receiving plates 22.

The actual piling snow depth at a location where the equipment can be disposed above the ground is measured to estimate the relation between the piling snow depth and the computed quantity of heat. This enables accurate estimation of the piling snow depth at a location within the runway 91.

The heat quantity measurement apparatuses 20a to 20c are installed at a plurality of locations within the runway 91. This enables estimation of the piling snow depths at a plurality of locations.

Note that the piling snow depth estimation expression is not limited to the above-described one, and may be other expressions. For example, it may be one considering quantity of solar radiation heat, quantity of solar reflection heat, quantity of atmospheric radiation heat, quantity of upward long-wave radiation heat, quantity of sensible heat by wind, quantity of sensible heat by rainfall or snowfall, quantity of latent heat by evaporation, quantity of side loss heat, and/or others. In this case, these quantities of heat may be actually measured, or estimated from air temperature, relative humidity, wind speed and/or other weather conditions, by actually measuring the weather conditions. This enables more accurate estimation of the piling snow depth.

On the other hand, Using the estimation expression $\Delta h_{ij}=k_j \, Q_{ij}$ in the above-described example doesn't require actual measurement of weather conditions or others, and thus enables reduction of the equipment cost. Experimental results demonstrate that the estimation using this estimation expression can obtain sufficient accuracy for practical use.

In addition, instead of separately finding out a coefficient of the piling snow depth estimation expression for each of the target temperatures, a coefficient of a piling snow depth estimation expression common to all the target temperatures may be found out.

For example, $\Delta h_i=k \, (Q_{ij}+p \, T_j+q)$ is used as the piling snow depth estimation expression. Here, k, p and q represent coefficients, and $T_j$ represents a target temperature. ($p \, T_j+q$) represents the quantity of heat applied to the snow receiving plate 22 due to the effect of weather conditions or other factors other than the quantity of heat $Q_G$ from the heater device 25, the quantity of heat $Q_C$ from geothermal heat or others. Among them, $p \, T_j$ represents a component that varies depending on the target temperature, and q represents a constant component regardless of the target temperature. These are assumed to be the same for all the heat quantity measurement apparatuses 20a to 20c at all the locations 12a to 12d and 13. Then, using not only the increment $\Delta h_1$ of the piling snow depth measured for the location 13 and the quantity of heat $Q_{1j}$ computed for the heat quantity measurement apparatus 20a to 20c at the location 13, but also the quantities of heat $Q_{ij}$ computed for the heat quantity measurement apparatuses 20a to 20c at the locations 12a to 12d, the coefficient k, p and q is found out by the least squares method or others. In such cases, the computed coefficients k, p and q may be used to compute the increments of the piling snow depth $\Delta h_i$ at each location 12a to 12d. Or, the increments $\Delta h_i$ of the piling snow depth simultaneously found out in the process of finding out the coefficient k, p and q by the least squares method or others may be used as it is, to estimate the piling snow depth $h_i$.

The embodiments described above are examples for facilitating understanding of the present invention. The present invention is not limited thereto and includes those that have been variously modified, altered, added, or removed without departing from the scope defined by the appended claims. This can be easily understood by those skilled in the art from the above description.

For example, the piling snow depth measurement system may measure the piling snow depth at any location, which is not limited to a runway of an airport, but where it is difficult to install equipment above the ground and to directly measure the piling snow depth.

REFERENCE SIGNS LIST

10: piling snow depth measurement system; 12a to 12d and 13: location; 14: piling snow depth measurement apparatus; 16: control apparatus; 20a to 20d: heat quantity measurement apparatus; 21: container; 22: snow receiving plate; 23: filler material; 24a to 24d: temperature sensor device; 25: heater device; 41: laser beam; 90: airport; 91: runway; S10: piling snow depth estimation process; S11: piling snow depth obtaining step; S14: heat quantity computation step; S15: coefficient computation step; and, S16: piling snow depth estimation step.

The invention claimed is:

1. A piling snow depth measurement system, comprising:
at least two heat quantity measurement apparatuses;
a piling snow depth measurement apparatus; and
a control apparatus,
wherein each of the heat quantity measurement apparatuses includes:
a snow receiving plate configured that falling snow piles up thereon;
a heater device configured to heat the snow receiving plate until temperature of the snow receiving plate becomes a predetermined target temperature exceeding 0 degrees Celsius; and
a heat flux density measurement apparatus configured to measure heat flux density transmitted from below to the snow receiving plate, wherein a first heat quantity measurement apparatus of the heat quantity measurement apparatuses is installed within a first location, wherein a second heat quantity measurement apparatus of the heat quantity measurement apparatuses is installed within a second location, wherein the piling snow depth measurement apparatus measures a piling snow depth of snow piling up at the first location, wherein the control apparatus computes a quantity of heat spent to melt snow falling on the snow receiving plate for each of the heat quantity measurement apparatuses, based on energy consumed by the heater device and a heat flux density measured by the heat flux density measurement apparatus, and wherein the control apparatus estimates a piling snow depth at the second location, based on the computed quantity of heat and the piling snow depth measured by the piling snow depth measurement apparatus.

2. The piling snow depth measurement system of claim 1, wherein the snow receiving plate is embedded in a ground so as to be at a height substantially the same as that of a ground surface therearound.

3. The piling snow depth measurement system of claim 1, further comprising a third heat quantity measurement apparatus and a fourth heat quantity measurement apparatus, wherein the snow receiving plate of the third heat quantity measurement apparatus is installed within the first location, wherein the snow receiving plate of the third fourth heat quantity measurement apparatus is installed in the second location, and wherein the control apparatuses of the third and fourth heat quantity measurement apparatuses control the heater device until temperatures of the snow receiving plates become a second target temperature different from the target temperature of the first and second heat quantity measurement apparatus.

4. The piling snow depth measurement system of claim 1, wherein the second location is within a runway of an airport, and wherein the first location is within the airport but other than a runway.

5. The piling snow depth measurement system of claim 1, wherein the control apparatus computes, as the quantity of heat spent to melt the snow falling on the snow receiving plate, a total sum of a quantity of heat from energy consumed by the heater device within a predetermined period of time, and a quantity of heat transmitted from the heat flux density measured by the heat flux density measurement apparatus to the snow receiving plate within the predetermined period of time.

6. The piling snow depth measurement system of claim 1, wherein the control apparatus computes, as an increment $\Delta h_2$ of the piling snow depth at the second location for a predetermined period of time, $\Delta h_1 \cdot Q_2 / Q_1$ based on the quantity of heat $Q_1$ computed for the first heat quantity measurement apparatus, an increment $\Delta h_1$ of the piling snow depth measured by the piling snow depth measurement apparatus for the predetermined period, and the quantity of heat $Q_2$ computed for the second heat quantity measurement apparatus.

* * * * *